United States Patent [19]
Yamamoto et al.

[11] Patent Number: 5,893,676
[45] Date of Patent: Apr. 13, 1999

[54] DEVICE FOR INTERLOCKING OPPOSED RACKS

[75] Inventors: Yoshimi Yamamoto, Shizuoka, Japan; Erik Preiholt, Eshilstuna, Sweden

[73] Assignee: Fuji Kiko Co., Ltd., Tokyo, Japan

[21] Appl. No.: 08/827,110

[22] Filed: Mar. 17, 1997

[30] Foreign Application Priority Data

Mar. 21, 1996 [JP] Japan ................................ 8-064035

[51] Int. Cl.⁶ ................................................ B62D 1/18
[52] U.S. Cl. .......................... 403/325; 403/321; 403/373; 74/493
[58] Field of Search ............... 403/83, 104, 105, 403/106, 107, 110, 325, 321, 373; 74/493; 280/775

[56] References Cited

U.S. PATENT DOCUMENTS

| | | |
|---|---|---|
| 1,319,630 | 10/1919 | Sloop . |
| 3,355,962 | 12/1967 | Gerdes et al. . |
| 4,357,050 | 11/1982 | Fisher, III .................... 297/367 |
| 4,594,909 | 6/1986 | Yamaguchi .................... 74/493 |
| 4,607,540 | 8/1986 | Kinoshita et al. .................... 74/493 |
| 4,684,140 | 8/1987 | Olivieri .................... 403/110 |
| 4,759,177 | 7/1988 | Brazell .................... 403/321 X |
| 4,938,093 | 7/1990 | Matsumoto et al. .................... 74/493 |
| 5,027,674 | 7/1991 | Nolte et al. .................... 74/493 |
| 5,029,489 | 7/1991 | Burmeister et al. .................... 74/493 |
| 5,052,240 | 10/1991 | Miyoshi et al. .................... 74/493 |
| 5,117,707 | 6/1992 | Kinoshita et al. .................... 74/493 |
| 5,222,410 | 6/1993 | Kinoshita .................... 74/493 |
| 5,338,064 | 8/1994 | Sadataka et al. .................... 280/775 |

*Primary Examiner*—Anthony Knight
*Assistant Examiner*—John R. Cottingham
*Attorney, Agent, or Firm*—Foley & Lardner

[57] ABSTRACT

An interlocking device includes two opposed racks having intermeshable teeth, respectively, a guide surface disposed on one of the opposed racks, a guide, and a resilient retainer holding the guide against the guide surface for sliding movement of the guide relative to the guide surface. The guide and the guide surface cooperate with each other to provide an arrangement wherein when the one rack is pressed against the other rack, the guide comes into engagement with the other rack and the guide surface slides on the guide, causing meshing engagement of the teeth of the one rack with the teeth of the other rack.

19 Claims, 6 Drawing Sheets

5,893,676

DEVICE FOR INTERLOCKING OPPOSED RACKS

BACKGROUND OF THE INVENTION

1. Field of the Invention

The present invention relates to a lock device for locking one of opposed racks against the other of the opposed racks, and more specifically to an interlocking device for assuring meshing engagement of teeth of the one of the opposed racks with teeth of the other thereof.

2. Description of the Related Art

It is well known to provide a device adapted for locking one of opposed racks against the other thereof.

Japanese Utility Model Application Second Publication No. 4-35259 discloses a device for locking a distance bracket secured to an adjustable steering column against a mount bracket secured to a vehicle body. The distance bracket is coupled to the mount bracket through a collar. The mount bracket has one rack and the collar has the other rack opposed to and engageable with the one rack. The distance bracket is securable to the mount bracket when the racks are engaged with each other, while the distance bracket is moveable relative to the mount bracket when the racks are disengaged from each other.

Generally, in the locking device including mutually engageable opposed racks, if, when one of the racks is pressed against the other of the racks, teeth of the one of the racks are out of alignment with teeth of the other thereof in such a way that tooth crests of the one of the racks are in contact with tooth crests of the other thereof, meshing engagement between the teeth of the racks will not be assured. This leads to undesirable reduction of operating performance of the locking device.

The present invention contemplates providing an interlocking device for assuring meshing engagement of teeth of the opposed racks without improper alignment of the teeth of one of the racks with the teeth of the other of the racks.

In a technical field of motor vehicles, the device of the present invention serves for facilitating adjustment of an adjustable steering column relative to a stationary bracket secured to the vehicle body.

SUMMARY OF THE INVENTION

According to one aspect of the present invention, there is provided an interlocking device comprising:

opposed racks having intermeshable teeth, respectively;
a guide surface disposed on one of the opposed racks;
a guide; and
a resilient retainer holding the guide against the guide surface for sliding movement of the guide relative to the guide surface;
the guide and the guide surface cooperating with each other to provide an arrangement wherein when the one of the opposed racks is pressed against the other of the opposed racks, the guide comes into engagement with the other of the opposed racks to cause the one of the opposed racks to move, as the guide surface slides on the guide, into meshing engagement of the teeth of the one of the opposed racks with the teeth of the other of the opposed racks.

According to another aspect of the present invention, there is provided a device for locking a distance bracket secured to an adjustable steering column against a mount bracket through a collar, comprising:

a first rack disposed on the mount bracket, the first rack having teeth;
a second rack disposed on the collar, the second rack having teeth meshable with the teeth of the first rack;
a guide surface disposed on the collar;
a guide; and
a resilient retainer holding the guide against the guide surface for sliding movement of the guide relative to the guide surface;
the guide and the guide surface cooperating with each other to provide an arrangement wherein when the second rack on the collar is pressed against the first rack on the mount bracket, the guide comes into engagement with the first rack to cause the second rack to move, as the guide surface slides on the guide, into meshing engagement of the teeth of the second rack with the teeth of the first rack.

DESCRIPTION OF THE PREFERRED EMBODIMENT

Figure 1:
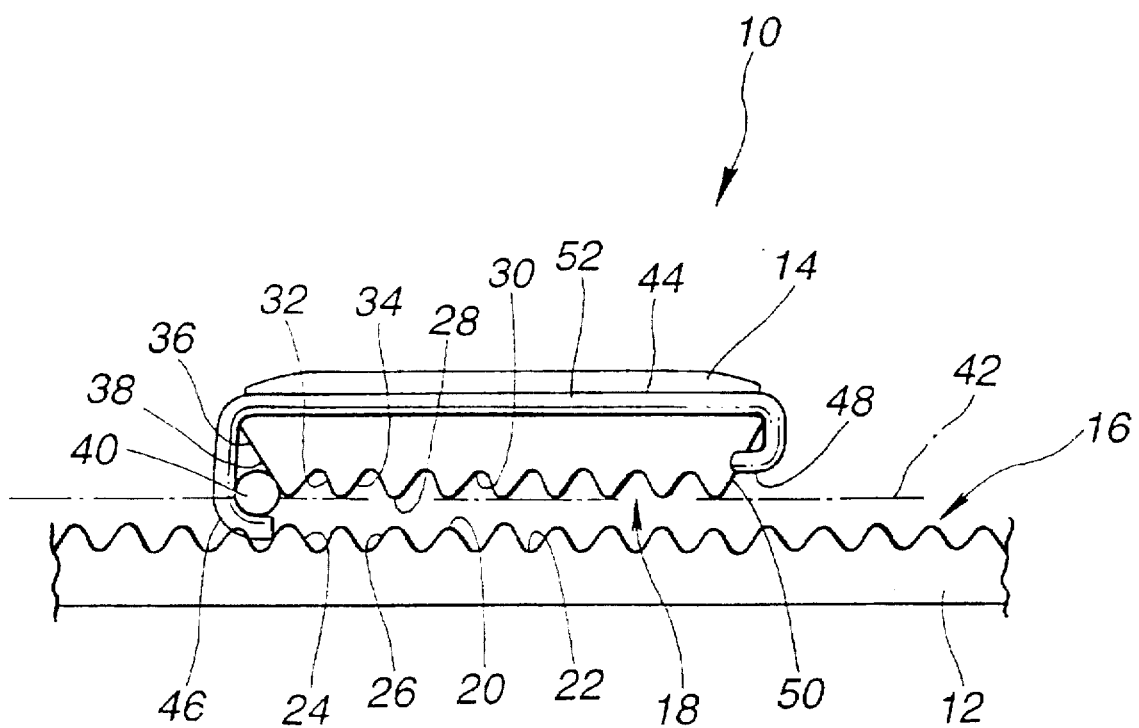
FIG. 1 is a side view of an interlocking device of a first embodiment according to the present invention.
Figure 2:
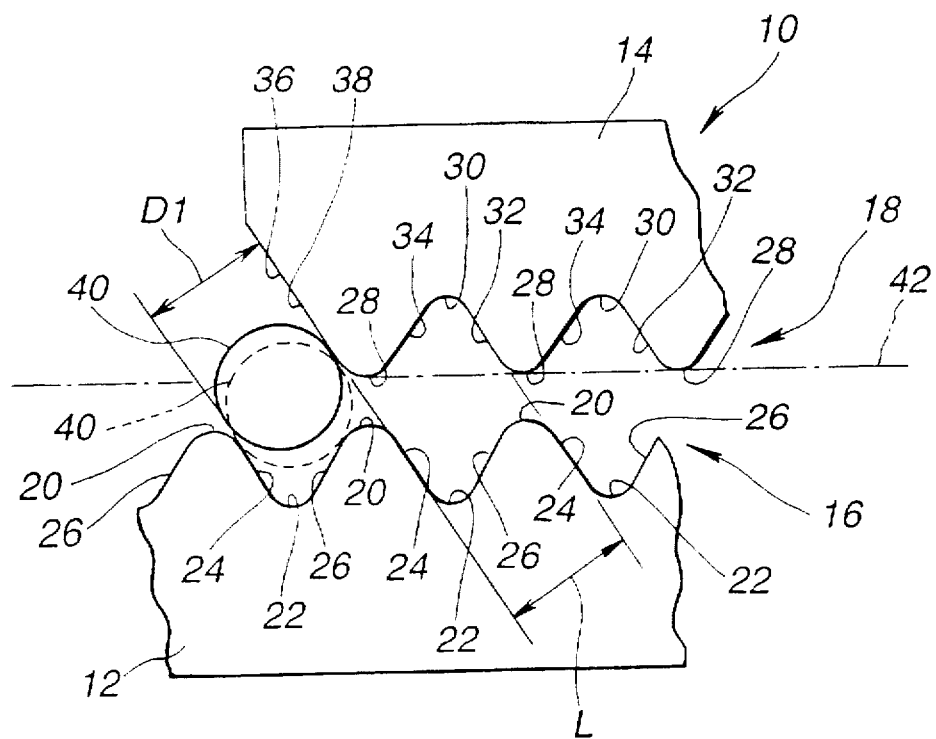
FIG. 2 is an enlarged view of a part of FIG. 1.

Referring to FIGS. 1 and 2, the first embodiment of an interlocking device 10 according to the present invention is now explained.

As illustrated in FIG. 1, the interlocking device 10 includes opposed racks 12 and 14 spaced apart from each other. The opposed racks 12 and 14 are adapted to be moveable close to each other to be engageable with each other in response to application of a force to one or both of the opposed racks 12 and 14. The opposed racks 12 and 14 have intermeshable teeth 16 and 18, respectively.

The teeth 16 are arranged along a length of a bar-like body of the rack 12 and parallel with each other. The teeth 16 include tooth crests 20 and tooth bottoms 22 which are alternately disposed in a direction of the length of the bar-like body of the rack 12. A tooth face 24 extends between the tooth crest 20 and the tooth bottom 22 on one side of each tooth of the teeth 16 and a tooth face 26 extends between the tooth crest 20 and the tooth bottom 22 on the other side of each tooth of the teeth 16. The tooth face 24 and the tooth face 26 are disposed in inclined relation to each other. The tooth faces 24 are parallel with each other and the tooth faces 26 are parallel with each other. Similarly, the teeth 18 are arranged along a length of a bar-like body of the rack 14 and parallel with each other. The teeth 18 are contoured into shapes corresponding to that of the teeth 16 so as to be meshed therewith. Tooth crests 28 and tooth bottoms 30 are alternately disposed in a direction of the length of the bar-like body of the rack 14. A tooth face 32 extends between the tooth crest 28 and the tooth bottom 30 on one side of each tooth of the teeth 18 and a tooth face 34 extends between the tooth crest 28 and the tooth bottom 30 on the other side of each tooth of the teeth 18. The tooth face 32 and the tooth face 34 are disposed in inclined relation to each other. The tooth faces 32 are parallel with each other and the tooth faces 34 are parallel with each other.

A guide surface 36 is disposed on one of the opposed racks 12 and 14. In this embodiment, the guide surface 36 is disposed on the rack 14. The guide surface 36 is disposed along a peripheral edge portion of the rack 14. The guide surface 36 includes a surface portion 38 connected to an outer-most one of the tooth crests 28 of the teeth 18. The surface portion 38 is contoured into a shape corresponding to a shape of the tooth faces 32 of the teeth 18, namely, a slanted planar surface. The surface portion 38 is disposed in parallel with the tooth faces 32.

A guide 40 is disposed on the guide surface 36. The guide 40 is in the form of a pin or shaft having a generally circular cross section and arranged in line long with the teeth 18 of the rack 14. The guide 40 is arranged such that its circumferential surface partly projects outwardly from an imaginary surface 42 defined by the tooth crests 28 toward the teeth 16 of the rack 12. By this arrangement, the guide 40 comes into contact with the teeth 16 of the rack 12 earlier than the teeth 18 of the rack 14 when the racks 12 and 14 are moved toward each other. Further, as illustrated in FIG. 2, the guide 40 has an outer diameter D1 equal to a distance L extending between the parallel tooth faces 24 of the adjacent two of the teeth 16 and therefore a distance extending between the parallel tooth faces 32 of the adjacent two of the teeth 18.

A resilient retainer 44 is so disposed as to hold the guide 40 against the guide surface 36 for sliding movement of the guide 40 relative to the guide surface 36. The resilient retainer 44 biases the guide 40 against the guide surface 36.

The guide 40 and the guide surface 36 cooperate with each other to provide an arrangement wherein when one of the racks 12 and 14 is pressed against the other of the racks 12 and 14, the guide 40 comes into engagement with the rack 12 to cause the rack 14 to move, as the guide surface 36 slides on the guide 40, into meshing engagement of the teeth 18 of the rack 14 with the teeth 16 of the rack 12.

Specifically, in this embodiment, the resilient retainer 44 is in the form of a bent bar-like spring mounted to the rack 14. The spring 44 is of a generally U shape including generally L-shaped guide holder portions 46 at its opposed distal ends which are engaged with spring retaining grooves formed on the circumferential surface of the guide 40. The spring 44 has a mount portion 48 seated on a surface 50 of the rack 14 which is opposed to the guide surface 36, and intermediate portions 52 respectively connecting the mount portion 48 and the guide holder portions 46. In FIG. 1, there are shown one of the generally L-shaped guide holder portions 46, one of the intermediate portions 52 connected to the one of the guide holder portions 46, and a part of the mount portion 48. By this engagement of the grooves with the guide holder portions 46 of the spring 44, the guide 40 is prevented from being displaced in a direction of an axis of the guide 40 and firmly retained in the axial direction on the guide surface 36.

The resilient retainer is not limited to the spring 44 and may be any other member as far as it can resiliently hold the guide against the guide surface for sliding movement of the guide relative to the guide surface.

Referring now to FIGS. 3A–3D, an operation of the interlocking device 10 of the present invention is explained.

Figure 3A:
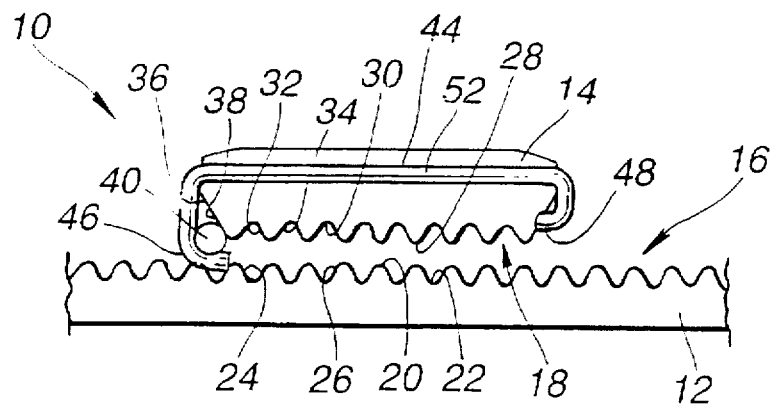
FIG. 3A–3D are an explanatory diagram showing an operation of the interlocking device of FIG. 1.

In FIG. 3A, the racks 12 and 14 are positioned in an initial state before their mutually approaching movements. The racks 12 and 14 are opposed to each other such that the tooth crests 20 of the teeth 16 and the tooth crests 28 of the teeth 18 are spaced apart from each other. The guide 40 retained on the guide surface 36 of the rack 14 is placed distant from the teeth 16 of the rack 12.

Figure 3B:
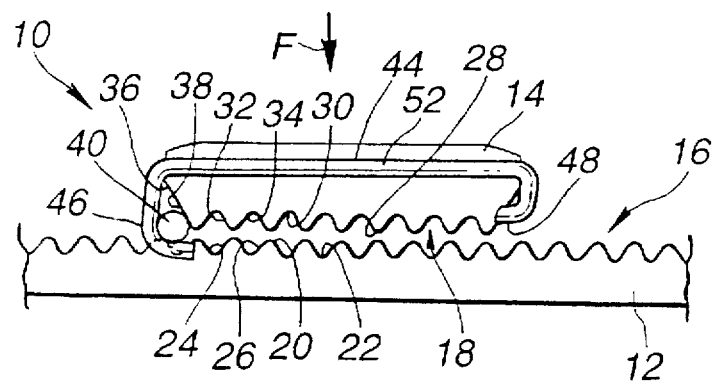

As illustrated in FIG. 3B, in a case where a force F is applied to the rack 14 to move the rack 14 from the initial position toward the rack 12, the guide 40 is moved close to the teeth 16 of the rack 12 as the rack 14 is moved toward the rack 12.

Figure 3C:
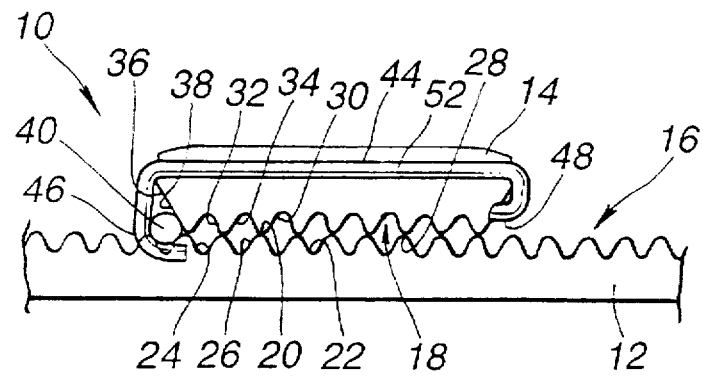

When the rack 14 is pressed toward the rack 12 to further approach the rack 12, the guide 40 is engaged in one of the tooth bottoms 22 of the teeth 16 of the rack 12 as shown in FIG. 3C. FIG. 2 illustrates the engaged state of the guide 40 by a phantom line. In this engaged state, the guide 40 contacts the tooth faces 24 and 26 on both sides of the tooth bottom 22 on its peripheral surface. The tooth faces 24 and 26 contacted with the guide 40 include tangents to a circle of the section of the guide 40, respectively. In addition, the tooth faces 32 of the teeth 18 are flush with the tooth faces 24 of the teeth 16 opposed to the teeth 18, and the tooth faces 34 of the teeth 18 are also flush with the tooth faces 26 of the teeth 16 opposed to the teeth 18. The surface portion 38 of the guide surface 36 is flush with the tooth face 24 disposed behind the tooth face 26 contacted with the guide 40.

When the rack 14 is further moved from the position of FIG. 3C toward the rack 12, the spring 44 resiliently deforms such that the guide 40 is allowed to slide on the guide surface 36 while being engaged in the tooth bottom 22. Namely, in this condition, the guide surface 36 slides on the guide 40 and then slides on the tooth face 24 flush with the surface portion 38. As the guide surface 36 slides on the guide 40 and the tooth face 24, the tooth faces 32 and 34 of the teeth 18 come into contact with the corresponding tooth faces 24 and 26 of the teeth 16, respectively.

Figure 3D:
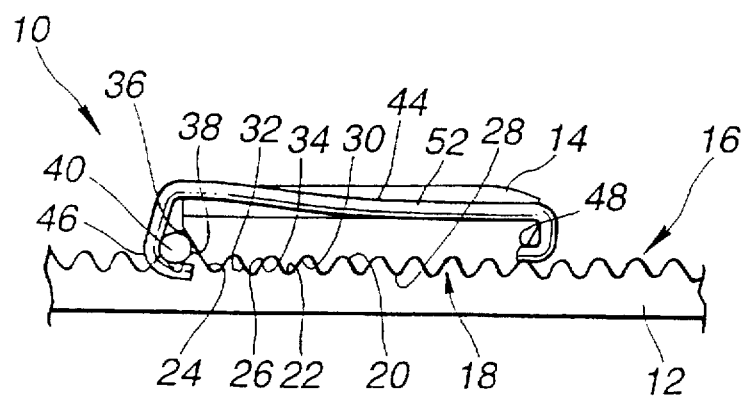

When the tooth crests 28 and tooth bottoms 30 of the teeth 18 engage the tooth bottoms 22 and tooth crests 20 of the teeth 16, the teeth 18 of the rack 14 are brought into meshing engagement with the teeth 16 of the rack 12 as shown in FIG. 3D.

Further, in a case where the guide 40 is contacted with one of the tooth crests 20 of the teeth 16 when the rack 14 is moved closer to the rack 12, the tooth crests 28 and tooth bottoms 30 of the teeth 18 of the rack 14 are opposed to the corresponding tooth bottoms 22 and tooth crests 20 of the teeth 16 of the rack 12. When the rack 14 is further moved toward the rack 12, the guide 40 is caused to slide onto the tooth face 24 via the one of the tooth crests 20 and then engage the tooth bottom 22. Subsequent to the engagement of the guide 40 in the tooth bottom 22, the sliding movement of the guide surface 36 on the guide 40 is caused so that the teeth 18 of the rack 14 are meshed with the teeth 16 of the rack 12, as explained above.

Accordingly, the interlocking device 10 of the present invention accomplishes the meshing engagement of the teeth 16 or 18 of one of the opposed racks 12 and 14 with the teeth 18 or 16 of the other thereof without abutting of the tooth crests 20 or 28 of the one rack against the tooth crests 28 or 20 of the other rack. Thus, the interlocking device 10 of the present invention assures proper alignment of the teeth 16 or 18 of one of the opposed racks 12 and 14 with the teeth 18 or 16 of the other thereof.

Figure 4:
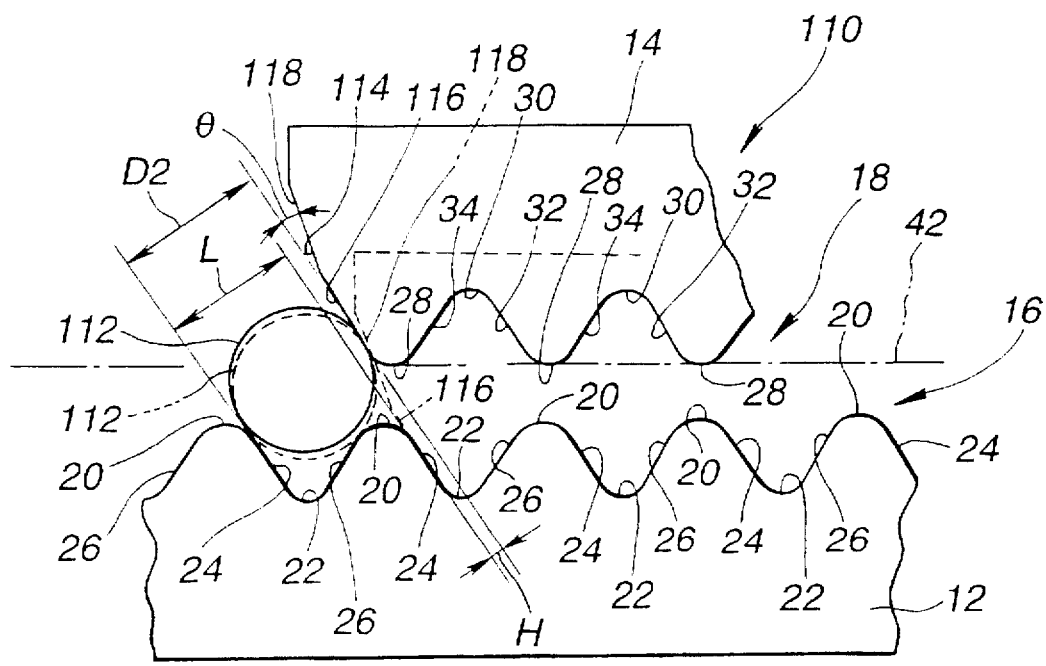
FIG. 4 is a view similar to FIG. 2, but showing an interlocking device of a second embodiment according to the present invention.

Referring to FIG. 4, a second embodiment of the interlocking device of the present invention will be explained. The second embodiment is similar to the first embodiment except that a guide surface is further provided with a sloped surface portion and a guide is increased in diameter. Therefore, like reference numerals denote like parts and detailed explanations therefor are omitted.

As illustrated in FIG. 4, the interlocking device 110 of the second embodiment includes the guide 112 arranged in line along with the teeth 18 of the rack 14. The guide 112 has a cylindrical shape such as a pin or shaft and has a diameter D2 which is greater than the distance L extending between the parallel tooth faces 24 of the adjacent two of the teeth 16 of the rack 12 by a predetermined distance H. As well as the guide 40 of the first embodiment, the guide 112 is arranged such that its circumferential surface partly projects outwardly from the imaginary surface 42 toward the teeth 16 of the rack 12.

The guide surface 114 disposed along a peripheral edge portion of the rack 14 includes a surface portion 116 connected to an outer-most one of the tooth crests 28 of the teeth 18. The surface portion 116 is shaped correspondingly to the tooth faces 32 of the teeth 18 and thus the surface portion 116 is in parallel with the tooth faces 32 thereof. A sloped surface portion 118 extends continuously and outwardly from the surface portion 116 and is inclined at an angle θ relative to the surface portion 116 so as to be further distant from the outer periphery of the guide 112 when the guide 112 is held on the surface portion 116. In other words, the sloped surface portion 118 is inclined at a steeper angle relative to the imaginary surface 42, i.e., the direction of the length of the rack 14.

An operation of the interlocking device 110 of the second embodiment is now explained. Similar to the first embodiment, in a case where the rack 14 of the interlocking device 110 is moved closer to the rack 12 thereof, the guide 112 is moved via a position indicated by a solid line in FIG. 4 to a position indicated by a phantom line in FIG. 4. In the position indicated by the solid line, the guide 112 is opposed to one of the tooth bottoms 22 of the teeth 16 of the rack 12 and in contact with the tooth face 24 disposed on one side of the tooth bottom 22. The surface portion 116 of the guide surface 114 is non-flush with the tooth face 24 disposed behind the tooth face 26 opposed to the guide 112 and offset from the tooth face 24 by the predetermined distance H. Therefore, the tooth faces 32 parallel to the surface portion 116 are non-flush with the corresponding tooth faces 24 and displaced from the corresponding tooth faces 24 by the predetermined distance H. In the position as indicated by the phantom line, the guide 112 is engaged with the tooth bottom 22 in contact with the tooth faces 24 and 26 disposed on both sides of the tooth bottom 22.

When the rack 14 is further moved toward the rack 12, the guide 112 is allowed by the resilient retainer to slide on the surface portion 116 and successively the sloped surface portion 118 of the guide surface 114 while being held in the position indicated by the phantom line of FIG. 4. Namely, the surface portion 116 and then the sloped surface portion 118 slide on the guide 112 to move from positions as indicated by solid lines to positions as indicated by phantom lines in FIG. 4. During the sliding movement of the surface portion 116 on the guide 112, the surface portion 116 approaches the tooth face 24. Subsequently, as the sloped surface portion 118 slides on the guide 112, the surface portion 116 slides on the tooth face 24 to compensate the offset distance H. Thus, the guide surface 114 is caused to move from its non-contact position in which the guide surface 114 is not contacted with the tooth face 24 nor flush therewith as shown in solid line in FIG. 4, to its contact position in which the surface portion 116 of the guide surface 114 mates with the tooth face 24. When the surface portion 116 reaches the contact position, the tooth faces 32 and 34 of the teeth 18 engage the corresponding tooth faces 24 and 26 of the teeth 16, respectively. To this end, the teeth 18 of the rack 14 are brought into meshing engagement with the teeth 16 of the rack 12. This serves for preventing abutting of the tooth crests 20 of the rack 12 and the tooth crests 28 of the rack 14 against each other. The abutting is caused due to non-uniform dimension of the diameter of the guide 112 in a case that the guide 112 is manufactured with decreased accuracy. Therefore, the interlocking device 110 of the present invention contributes to reduction of the manufacturing cost by preventing the abutting of the tooth crests 20 and 28 of the racks 12 and 14.

As described above, the interlocking device 110 of the second embodiment according to the present invention also establishes the meshing engagement of the teeth 16 or 18 of one of the opposed racks 12 and 14 with the teeth 18 or 16 of the other thereof, assuring proper alignment of the teeth 16 or 18 of the one of the opposed racks 12 and 14 with the teeth 18 or 16 of the other thereof.

Referring to FIGS. 5–11, a third embodiment of the interlocking device of the present invention will be explained hereinbelow, which is used in an adjustable steering column assembly 200 of a tilting type.

Figure 5:
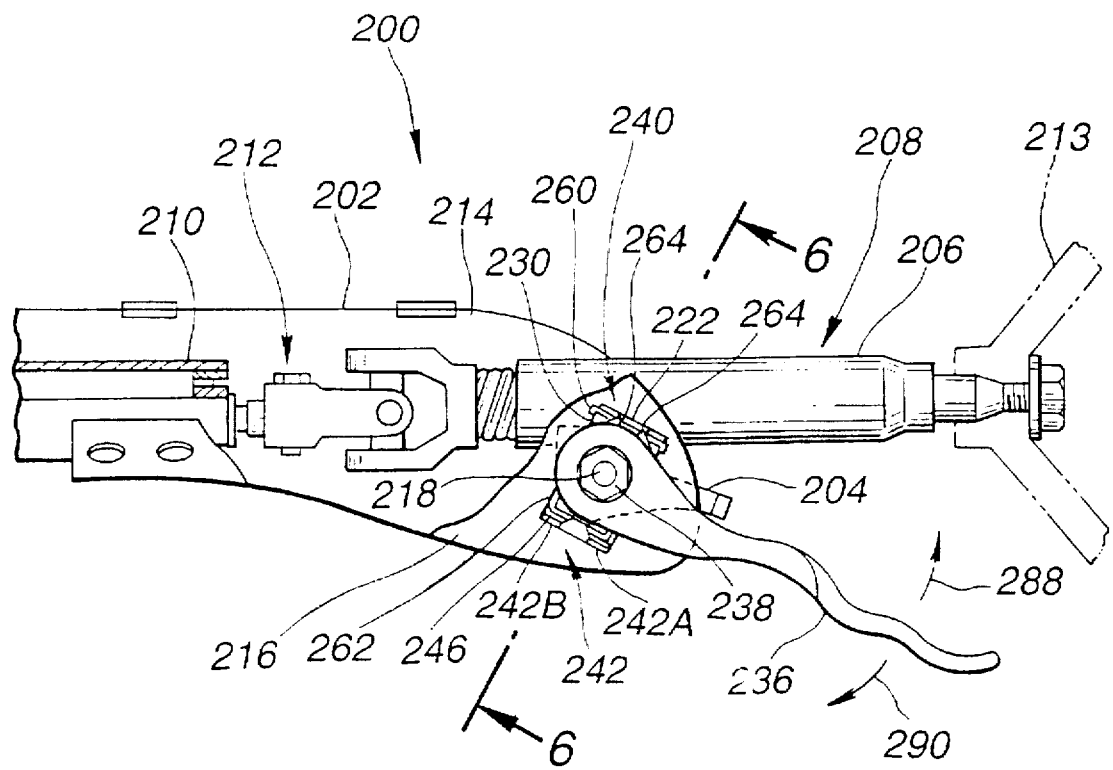
FIG. 5 is a side view, partly broken off, of an adjustable steering column assembly to which an interlocking device of a third embodiment according to the present invention is incorporated.
Figure 6:
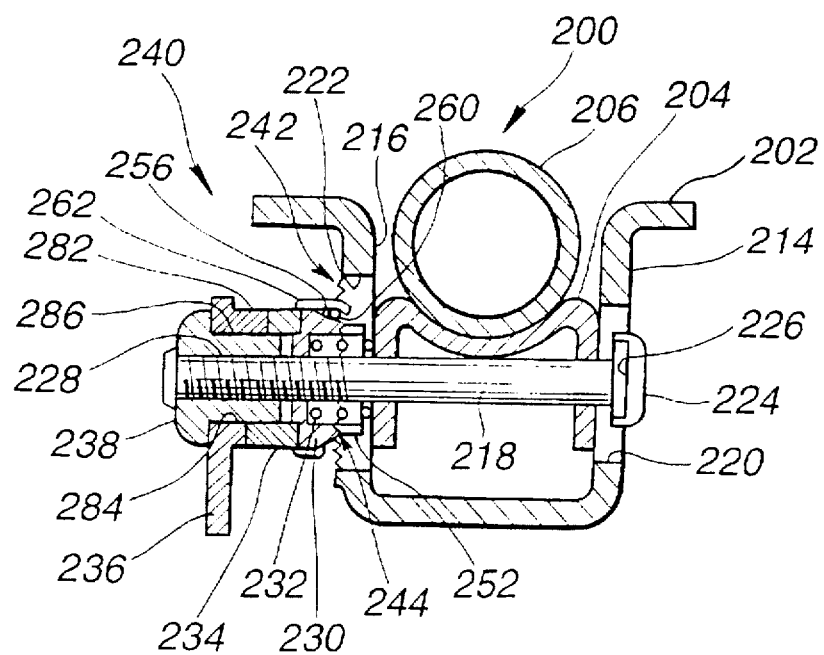
FIG. 6 is a section taken along line 6—6 of FIG. 5.

As illustrated in FIGS. 5 and 6, the adjustable steering column assembly 200 includes a mount or stationary bracket 202 and a distance or moveable bracket 204 which is disposed moveably relative to the mount bracket 202 and secured to an upper column portion 206 of a steering column 208. The upper column portion 206 is connected to a lower column portion 210 through a universal coupling 212. Reference numeral 213 denotes a steering wheel mounted to the steering column 208. The mount bracket 202 is adapted to be secured to a vehicle body and has opposed upright wall portions 214 and 216 extending in parallel and spaced relation to each other. As best shown in FIG. 6, the distance bracket 204 is disposed between the upright wall portions 214 and 216 of the mount bracket 202. A bolt 218 passes through the upright wall portions 214 and 216 and the distance bracket 204 via elongated openings 220 and 222 respectively formed in the upright wall portions 214 and 216. The elongated openings 220 and 222 are of a generally rectangular shape and permit movement of the bolt 218 along the elongated openings 220 and 222. The bolt 218 has at one end thereof a detent portion 224 formed with a recess 226 engaged with the elongated opening 220 of the upright wall portion 214, and a threaded portion 228 at an opposite end thereof projecting outward from the elongated opening 222 of the upright wall portion 216. A collar 230 is mounted to the threaded portion 228 of the bolt 218 and connected to the distance bracket 204 through a return spring 232 disposed therebetween. A one-way cam 234, a tilt lever 236, and a nut 238 are mounted to the threaded portion 228 and operatively connected to the collar 230.

The interlocking device 240 of the third embodiment includes a rack 242 disposed on the upright wall portion 216 of the mount bracket 202 and a rack 244 disposed on the collar 230. The rack 242 includes two spaced rack portions 242A and 242B disposed on both sides of the elongated opening 222, as shown in FIG. 5. The rack portions 242A and 242B each have teeth 246 arranged similar to the teeth 16 of the rack 12 of the first embodiment. Like reference numerals denote like parts and therefore detailed explanations therefor are omitted. The teeth 246 of the rack 242 are meshable with teeth of the rack 244 of the collar 230 which is explained later.

As illustrated in FIGS. 7–11, the collar 230 is in the form of a generally rectangular-shaped brick and has a center opening 250 receiving the bolt 218. The collar 230 has a stop portion 252 projecting outward from one end face thereof and engaged with the elongated opening 222 of the upright wall portion 216. The stop portion 252 prevents rotation of the collar 230 relative to the upright wall portion 216 by engagement with longitudinally extending side edges of the elongated opening 222 but allows a movement of the collar 230 along the elongated opening 222 until the stop portion 252 abuts on one of opposed end edges of the elongated opening 222. The collar 230 has the rack 244 including two spaced rack portions 244A and 244B disposed on both sides of the stop portion 252. Each of the rack portions 244A and 244B has the teeth 254 meshable with the teeth 246 of the rack portions 242A and 242B of the upright wall portion 216. The teeth 254 are arranged similar to the teeth 18 of the rack 14 of the first embodiment. Like reference numerals denote like parts and therefore detailed explanations therefor are omitted.

Figure 8:
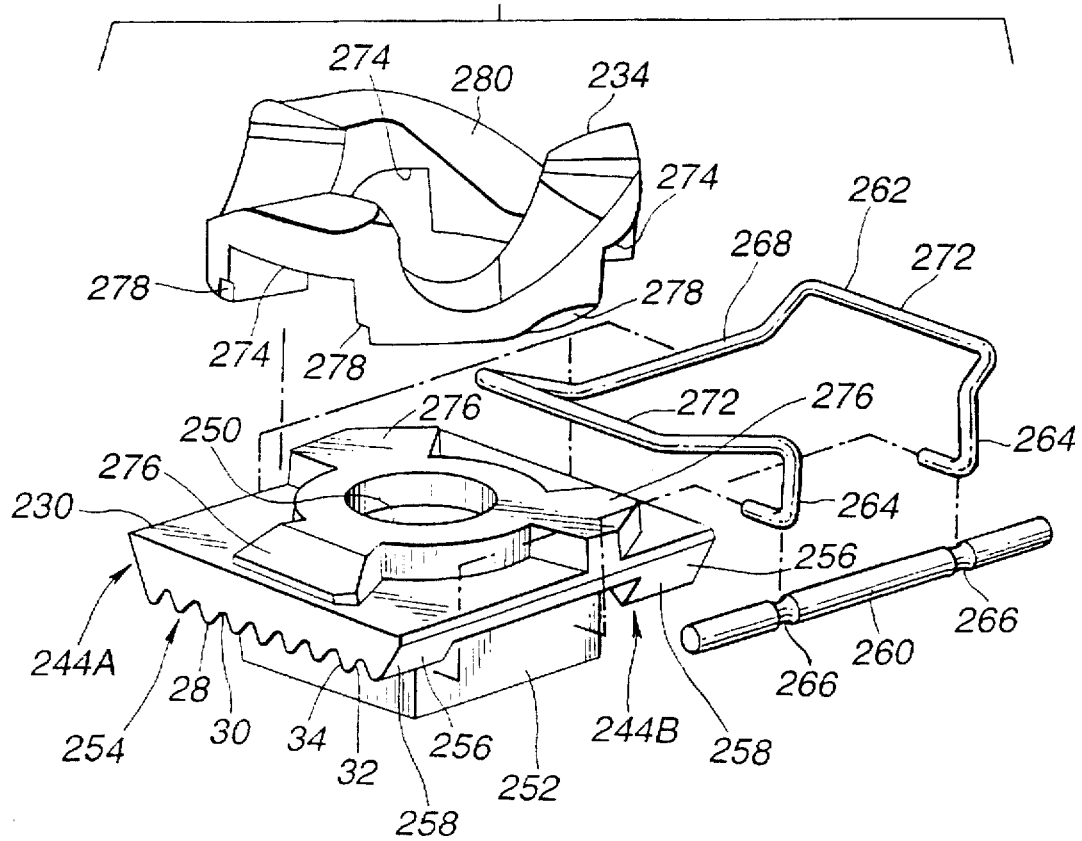
FIG. 8 is an exploded perspective view of FIG. 7.
Figure 10:
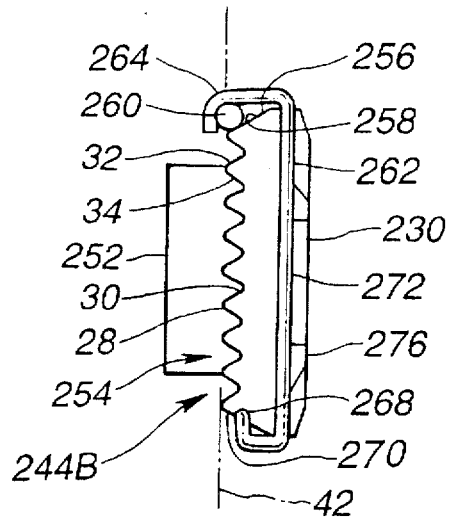
FIG. 10 is a view, as viewed in a direction indicated by arrow 10 of FIG. 7, of the collar.
Figure 11:
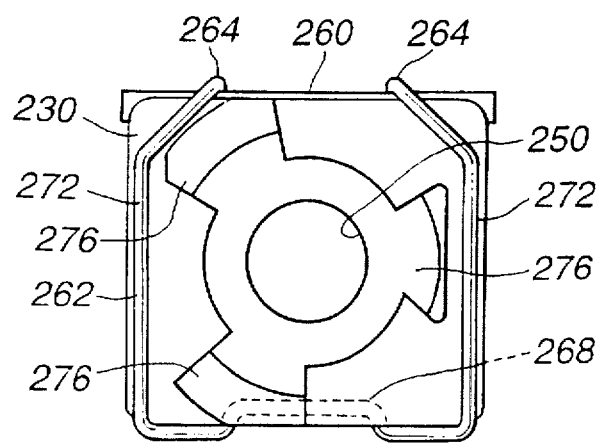
FIG. 11 is a view, as viewed in a direction opposite to the direction of the arrow 9 of FIG. 7, of the collar.

A guide surface 256 is disposed on a peripheral portion of the rack 244 which is a part of a peripheral surface of the collar 230. As best shown in FIGS. 8 and 10, the guide surface 256 includes a surface portion 258 connected to an outer-most one of the tooth crests 28 of the teeth 254. The surface portion 258 is contoured into a shape corresponding to a shape of the tooth faces 32 of the teeth 254 and disposed in parallel with the tooth faces 32. The surface portion 258 is slant with respect to the one end face of the collar 230.

A guide 260 is disposed on the surface portion 258 of the guide surface 256. The guide 260 is in the form of a pin or shaft and has an outer diameter equal to a distance extending between the parallel tooth faces 32 of the adjacent two of the teeth 254. The guide 260 has a length substantially equal to a length of the one side periphery of the collar 230. As best shown in FIG. 10, the guide 260 is arranged in line along with the teeth 254 of the rack 244 and disposed in a normal position in which a circumferential surface of the guide 260 partly projects outwardly from the imaginary surface 42 defined by the tooth crests 28 of the teeth 254. Thus, the guide 260 comes into contact with the teeth 246 of the rack 242 earlier than the teeth 254 of the rack 244 when the rack 244 of the collar 230 is moved toward the rack 242 of the upright wall portion 216 of the mount bracket 202.

Figure 9:
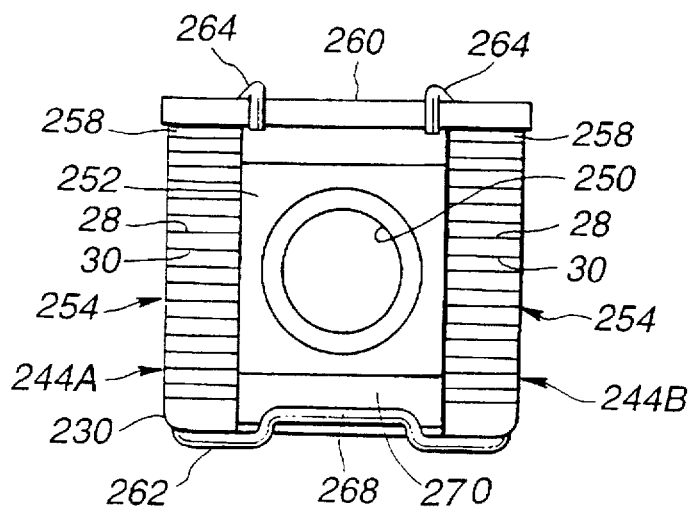
FIG. 9 is a view, as viewed in a direction indicated by arrow 9 of FIG. 7, of the collar.

A resilient retainer 262 is so disposed as to bias the guide 260 against the guide surface 256 and hold the guide 260 against the guide surface 256 for sliding movement of the guide 260 relative to the guide surface 256. Specifically, the resilient retainer 262 is in the form of a bent bar-like spring as best shown in FIG. 8, and mounted to the collar 230. The resilient retainer 262 has at its opposite distal ends generally L-shaped guide holder portions 264 engaged with spring retaining grooves 266 which are formed on the circumferential surface of the guide 260. By this engagement of the grooves 266 with the guide holder portions 264 of the resilient retainer 262, the guide 260 is retained relative to the guide surface 256 without being axially displaced. The resilient retainer 262 has a mount portion 268 seated on a peripheral surface 270 of the collar 230 as shown in FIG. 9, which is disposed between the rack portions 244A and 244B in opposite relation to the guide surface 256. The resilient retainer 262 also has intermediate portions 272 respectively connecting the mount portion 268 and the guide holder portions 264.

The guide 260 and the guide surface 256 cooperate with each other to provide an arrangement wherein when the rack 244 of the collar 230 is pressed against the rack 242 of the upright wall portion 216 of the mount bracket 202, the guide 260 comes into engagement with the rack 242 to cause the rack 244 to move, as the guide surface 256 slides on the guide 260, into meshing engagement of the teeth 254 of the rack 244 with the teeth 246 of the rack 242.

Figure 7:
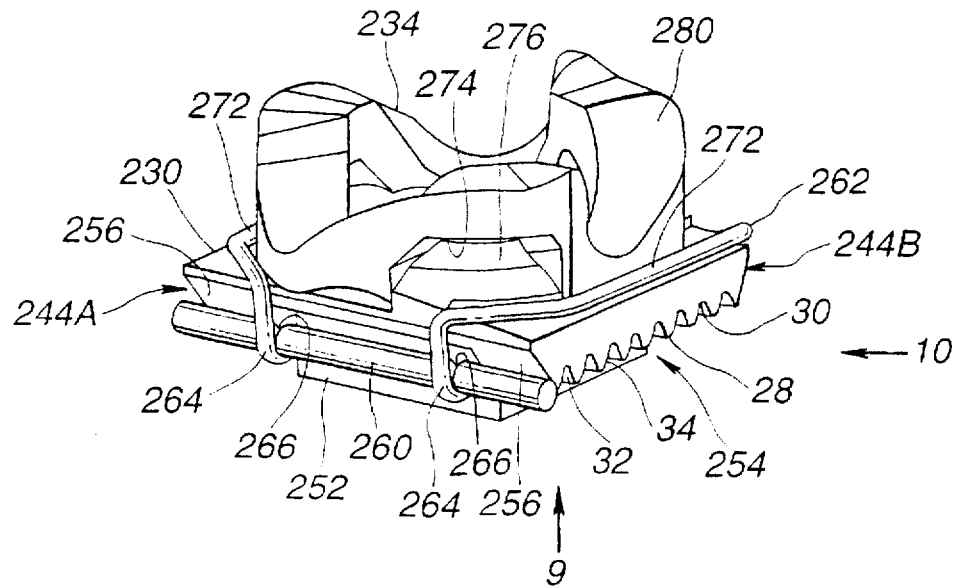
FIG. 7 is a perspective view showing a collar and one-way cam which are used in the interlocking device of FIG. 5.

The one-way cam 234 is disposed on an opposite end face of the collar 230. As illustrated in FIGS. 7 and 8, the one-way cam 234 is formed into a generally annular shape and has recessed portions 274 on its one end face. The recessed portions 274 are engaged with sectorial projections 276 which extend outward from the opposite end face of the collar 230 and are disposed around the center opening 250 of the collar 230 in spaced relation to each other. The recessed portions 274 radially extend from an inner circumferential surface of the one-way cam 234 to an outer circumferential surface thereof, respectively. By the engagement of the recessed portions 274 with the projections 276, the one-way cam 234 is coupled with the collar 230 to make a unitary motion therewith. The one-way cam 234 has cutouts 278 disposed on peripheral edges of the recessed portions 274 and along the outer circumferential surface of the one-way cam 234. The cutouts 278 are engaged with the intermediate portions 272 of the resilient retainer 262, serving for holding the resilient retainer 262 on the collar 230. The one-way cam 234 has on its opposite end face a sloped cam surface 280 contacted with a protrudent portion 282 of the tilt lever 236 as shown in FIG. 6. The one-way cam 234 may be formed integrally with the collar 230.

As shown in FIG. 6, the tilt lever 236 has a bore 284 to which a boss portion 286 of the nut 238 is fitted. The nut 238 and the tilt lever 236 are coupled to each other to cooperate together. The nut 238 is screwed on the threaded portion 228 of the bolt 218.

In the adjustable steering column assembly 200, the interlocking device 240 of the third embodiment of the present invention is operated as explained hereinafter.

When the tilt lever 236 is rotated in one of directions as indicated by arrows 288 and 290 in FIG. 5, the nut 238 with the tilt lever 236 moves on the bolt 218 to urge the one-way cam 234 and the collar 230 toward the upright wall portion 216 of the mount bracket 202 against the biasing force of the return spring 232. When the rack 244 of the collar 230 is pressed against the rack 242 of the upright wall portion 216 by the rotation of the tilt lever 236, the guide 260 comes into engagement with the tooth bottom of the teeth 246 of the rack 242. When the rack 244 is further pressed against the rack 242 by further rotation of the tilt lever 236, the guide surface 256 is allowed to slide on the guide 260 by resilient deformation of the resilient retainer 262. Then, the teeth 254 of the rack 244 are brought into meshing engagement with the teeth 246 of the rack 242 without abutting of the tooth crests of the teeth 254 against the tooth crests of the teeth 246. This meshing engagement causes frictional engagement between the distance bracket 204 and the upright wall portions 214 and 216 of the mount bracket 202. Thus, the distance bracket 204 is locked against the mount bracket 202 so that the steering column 208 is fixed to a desired position relative to the mount bracket 202.

On the other hand, when the tilt lever 236 is rotated in the other of the directions 288 and 290 of FIG. 5, the nut 238 with the tilt lever 236 moves on the bolt 218 in such a direction as to be away from the one-way cam 234. The one-way cam 234 and the collar 230 are urged by the return spring 232 to move away from the upright wall portion 216 of the mount bracket 202. By this movement of the collar 230 away from the upright wall portion 216, the teeth 254 of the rack 244 of the collar 230 are disengaged from the teeth 246 of the rack 242 of the upright wall portion 216. At this time, the guide surface 256 is allowed to slide on the guide 260 and then free from contact with the corresponding tooth face of the teeth 246 of the rack 242. Then, the guide 260 is disengaged from the tooth bottom of the teeth 246 of the rack 242 and moved to the normal position. When the rack 244 of the collar 230 moves distant from the rack 242 of the upright wall portion 216, the distance bracket 204 is in a released position in which the distance bracket 204 is not locked against the mount bracket 202.

In addition, the arrangement of the guide and the guide surface as explained in the second embodiment may be used in the adjustable steering column assembly 200.

The interlocking device 240 of the third embodiment according to the present invention may be also used in an adjustable steering column assembly of a known telescopic type.

As is appreciated from the above description, the device of the present invention can be utilized in other locking apparatus which include relatively moveable opposed racks having intermeshable teeth.

What is claimed is:

1. An interlocking device comprising:

opposed racks having intermeshable teeth, respectively;

a guide surface disposed on one of the opposed racks;

a guide; and a resilient retainer holding said guide against said guide surface for sliding movement of said guide relative to said guide surface;

said guide and said guide surface cooperating with each other to provide an arrangement wherein when said one of the opposed racks is pressed against the other of the opposed racks, said guide moves from a disengaged position into engagement with the other of the opposed racks to cause said one of the opposed racks to move, as said guide surface slides on said guide, the teeth of said one of the opposed racks into meshing engagement with the teeth of the other of the opposed racks.

2. An interlocking device as claimed in claim 1, wherein said guide is so disposed as to project outwardly from an imaginary surface defined by tooth crests of the teeth of said one of the opposed racks toward the teeth of the other of the opposed racks.

3. An interlocking device as claimed in claim 2, wherein said guide surface includes a first surface portion which is connected to a tooth crest and parallel with tooth faces of the teeth of said one of the opposed racks.

4. An interlocking device as claimed in claim 3, wherein said guide includes a pin extending in parallel to the teeth of said one of the opposed racks.

5. An interlocking device as claimed in claim 1, wherein said resilient retainer includes a spring.

6. An interlocking device as claimed in claim 4, wherein said pin has a diameter equal to a distance extending between parallel tooth faces of adjacent teeth of each of the opposed racks.

7. An interlocking device as claimed in claim 4, wherein said pin has a greater diameter than a distance extending between parallel tooth faces of adjacent teeth of each of the opposed racks.

8. An interlocking device as claimed in claim 5, wherein said guide has a spring retaining groove engaged with the spring.

9. An interlocking device as claimed in claim 7, wherein said guide surface includes a second surface portion inclined relative to the first surface portion.

10. A device for locking a distance bracket secured to a steering column against a mount bracket through a collar coupled to the distance bracket, comprising:

a first rack disposed on the mount bracket, said first rack having teeth;

a second rack disposed on the collar, said second rack having teeth meshable with the teeth of said first rack;

a guide surface disposed on the collar;

a guide; and a resilient retainer hold said guide against said guide surface for sliding movement of said guide relative to said guide surface;

said guide and said guide surface cooperating with each other to provide an arrangement wherein when said second rack on the collar is pressed against said first rack on the mount bracket, said guide moves from a disengaged position into engagement with said first rack to cause said second rack to move, as said guide surface slides on said guide, the teeth of said second rack into meshing engagement with the teeth of said first rack.

11. A device as claimed in claim 10, wherein said first rack and said second rack include two spaced rack portions, respectively.

12. A device as claimed in claim 10, wherein said guide is so disposed as to project outwardly from a tooth crest of said second rack toward the teeth of said first rack.

13. A device as claimed in claim 12, wherein said guide surface includes a first surface portion which is connected to a tooth crest and parallel with tooth faces of the teeth of said second rack.

14. A device as claimed in claim 13, wherein said guide includes a pin extending in parallel to the teeth of said second rack.

15. A device as claimed in claim 10, wherein said resilient retainer includes a spring.

16. A device as claimed in claim 14, wherein said pin has a diameter equal to a distance extending between parallel tooth faces of adjacent teeth of each of said first and second racks.

17. A device as claimed in claim 14, wherein said pin has a greater diameter than a distance extending between parallel tooth faces of adjacent teeth of each of said first and second racks.

18. A device as claimed in claim 15, wherein said guide has a spring retaining groove engaged with the spring.

19. A device as claimed in claim 17, wherein said guide surface includes a second surface portion inclined relative to the first surface portion.

* * * * *